United States Patent Office 3,130,293
Patented Apr. 21, 1964

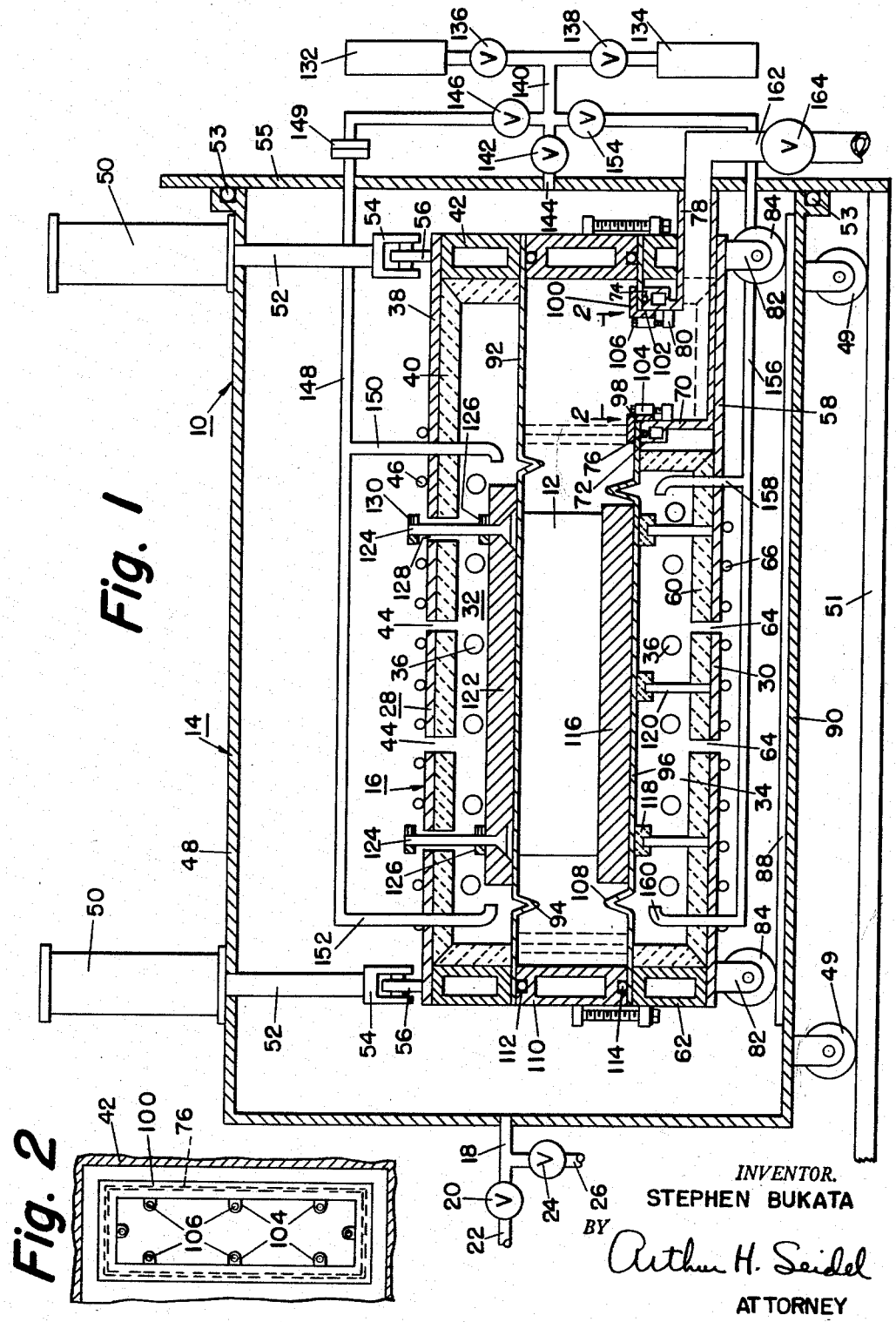

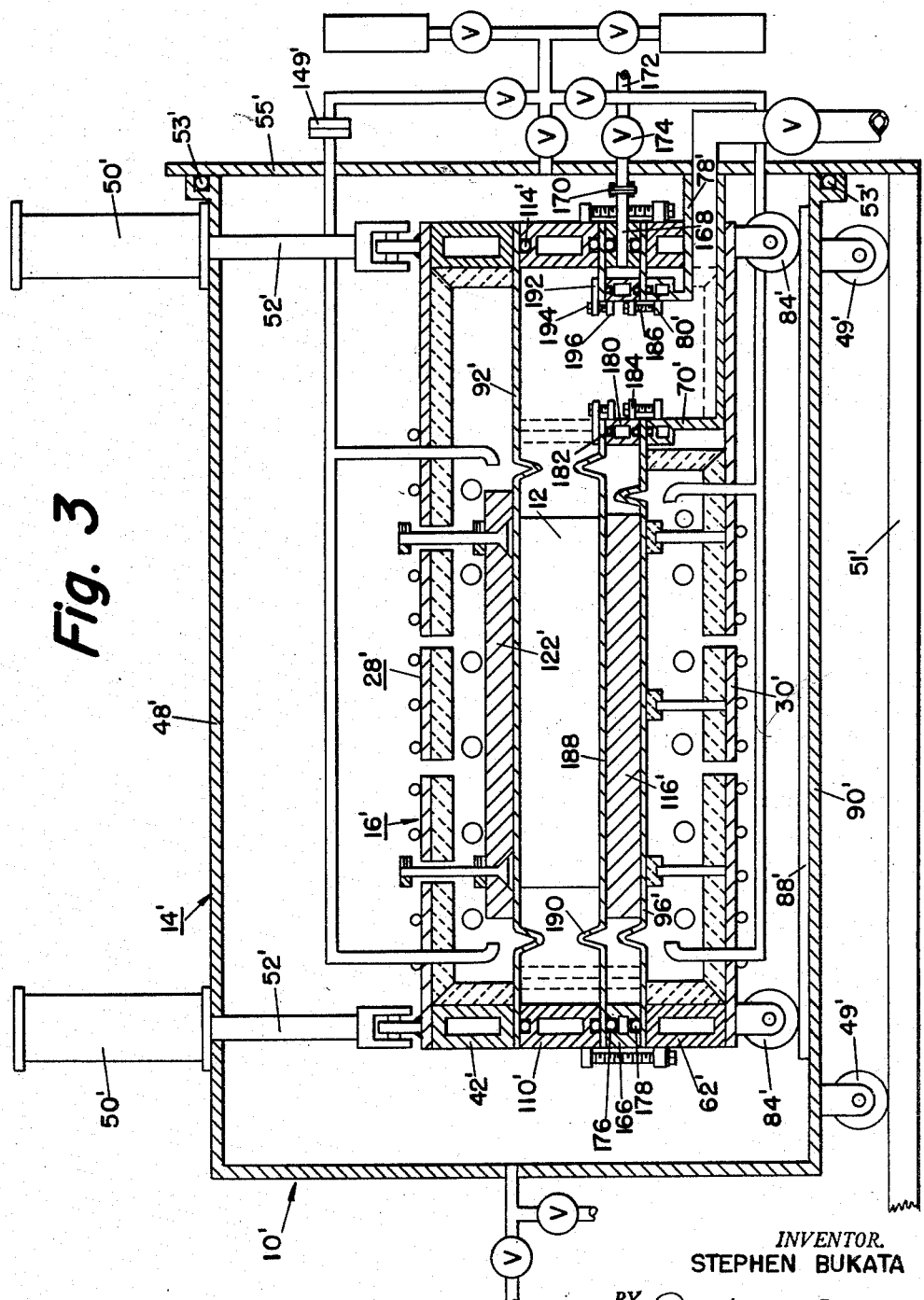

1

3,130,293
BRAZING FURNACE
Stephen Bukata, 7813 Ardleigh St., Philadelphia 18, Pa.
Filed Jan. 19, 1960, Ser. No. 3,430
10 Claims. (Cl. 219—85)

The present invention relates to a furnace, and more particularly to a furnace for brazing sandwich panels comprising a honeycomb or the like core disposed intermediate cover sheets. This is a continuation-in-part of my copending application Serial No. 745,129, filed June 27, 1958, for "Furnace," now Patent No. 3,093,104, and my application Serial No. 830,935, filed July 31, 1959, for "Furnace," now Patent No. 3,064,118.

The need for structural materials which have high strength-to-weight ratios and remain structurally sound at elevated temperatures has resulted in a concentrated effort to develop stainless steel, or titanium or like metal sandwich structures. Such sandwich structures have excellent fatigue characteristics under extreme conditions of heat, vibration, and sound, so that they comprise preferred constructional materials for high speed aircraft and missiles.

Unfortunately, the cost of manufacture of sandwich structures by conventional techniques is very great. At the present time, many forms of sandwich panels have a cost of a thousand dollars per cubic foot and more.

An appreciable part of the cost of sandwich structures lies in the cost of brazing the core to the cover sheets and to the edge members. Particularly is this the case where the metallurgical considerations affecting the braze require that the brazing be done under vacuum conditions, or in a selected closely controlled atmosphere, such as an atmosphere comprising an inert gas. At the present time, brazing operations of the aforesaid type are effected using welded envelopes which are expensive to construct, and which must be cut open to effect removal of the sandwich structure.

In addition, it has been found that after a panel of the sandwich structure has been brazed, it is necessary to subject the panel to a heat-treat procedure to develop maximum strength in the panel. The heat-treat process requires rapid cooling of the panel and also subsequent sub-zero cooling of the panel. Generally, this cooling has been accomplished by removing the envelope containing the panel and inserting the entire unit into a refrigerated enclosure. After cooling, the entire unit is again put back into the brazing furnace for further heat treatment. This transferring of the enevelope back and forth between the furnace and the refrigerated enclosure is not only time consuming so as to add to the cost of the sandwich structure, but can also cause the sandwich structure to be damaged during handling.

It is an object of the present invention to provide a novel furnace.

It is another object of the present invention to provide a novel furnace for brazing sandwich assemblies.

It is still another object of the present invention to provide a furnace in which brazing may be effected under closely controlled atmospheric conditions including high vacuum conditions.

It is a further object of the present invention to provide a furnace for brazing sandwich assemblies in which the sandwich assemblies can be subjected to a heat-treat process without being removed from the furnace.

Other objects will appear hereinafter.

For the purpose of illustrating the invention there is shown in the drawings forms which are presently preferred; it being understood, however, that this invention is not limited to the precise arrangements and instrumentalities shown.

2

FIGURE 1 is a longitudinal sectional view of a furnace of the present invention.

FIGURE 2 is a top elevational view looking in the direction of arrows 2—2 in FIGURE 1.

FIGURE 3 is a longitudinal sectional view of a modification of the furnace of the present invention.

Referring to the drawing, and initially to FIGURE 1, the furnace of the present invention is generally designated as 10. Furnace 10 is a brazing furnace for brazing sandwich structures designated generally as 12. Such sandwich structure 12 includes a core, which may comprise a honeycomb core, waffle core, or other suitable core structures. The core is to be brazed by thin leaves of braze metal between cover sheets and channel-shaped edge members as is well known in the art.

The furnace 10 comprises a housing 14, and a retort portion, generally designated as 16, mounted within the housing 14. The housing 14 is an imperforate shell which is open at only one end. A door or faceplate 55 extends across the open end of the housing 14, and the door is sealed to the housing 14 by a gas-tight seal 53. Housing 14 is supported on tracks 51 by wheels 49. The door, or faceplate 55 is generally anchored to the ground or supporting surface. Housing 14 is provided with a port 18. Port 18 is connected through valve 20 and pipe 22 to a pressure control means, such as a vacuum pump or an air pressure pump. Port 18 is connected through valve 24 and pipe 26 to the atmosphere. Thus, the casing 14 can be opened to atmospheric pressure, or can be placed under sub-atmospheric pressures, or can be raised to pressures higher than atmospheric.

The retort portion 16 of the furnace 10 includes an oven top 28 and an oven bottom 30. Oven top 28 and oven bottom 30 comprise integral members, preferably formed from ceramic or other analogous kiln or furnace materials having similar high temperature characteristics. Oven top 28 and oven bottom 30 may comprise similar members formed as single trays. Thus, the end walls 32 of oven top 28 and the end walls 34 of oven bottom 30 provide support for the electric heating elements 36 which raise the temperature within the furnace 10 to a suitable level to effect brazing (a temperature above the melting point or solidus temperature of the braze metal used). The electric heating elements 36 may comprise similar heating elements shaped in the form of elongated cylinders. I have found that silicon carbide cylindrical heating elements are most suitable for use in the furnace of the present invention. However, other types of heating elements can be used, such as induction heaters, resistance wire heating elements, or quartz lamps. In the illustrated embodiment, twelve electric heating elements 36 are illustrated. However, it is to be understood that a greater or smaller number of heating elements 36 may be provided.

A metal plate 38 is secured across the outer surface of the top wall 40 of the oven top 28. The metal plate 38 projects beyond the edges of the top wall 40. A top closure member 42 extends entirely around the oven top 28, and is secured to the bottom surface of the plate 38. Top closure member 42 has a hollow interior which may be used as a water jacket, or jacket for other liquid or gas coolant. The top wall 40 of the oven top 28 and the plate 38 have a plurality of holes 44 therethrough, through which holes 44 the interior of the oven top 28 is in communication with the interior of the housing 14. Water cooled copper tubes 46 extend across the outer surface of the plate 38, and are secured to the plate 38, such as by soldering.

The assembly of the oven top 28, the plate 38, and the top closure member 42 is supported from the top wall 48 of the housing 14 by hydraulic cylinders 50. The hydraulic cylinders 50 are seated on the top wall 48 of the housing 14, and the piston rods 52 extend downwardly from the hydraulic cylinders 50 through the top wall 48 to the plate 38. Each of the piston rods 52 has a clevis 54 at its bottom end. The clevises 54 extend around and are pivotally connected to tongues 56 which are secured to the top surface of the plate 38. By operating the hydraulic cylinders 50, the assembly of the oven top 28, plate 38, and top closure member 42 can be raised or lowered.

A metal plate 58 is secured across the outer surface of the bottom wall 60 of the oven bottom 30. A bottom closure member 62 extends completely around the oven bottom 30, and is secured to the top surface of the plate 58. Bottom closure member 62 has a hollow interior which may be used as a water jacket, or jacket for other liquid or gas coolant. The bottom wall 60 of the oven bottom 30 and the plate 58 have a plurality of holes 64 therethrough, through which holes 64 the interior of the oven bottom 30 is in communication with the interior of the housing 14. Water cooled copper tubes 66 extend across and are secured to the bottom surface of the plate 58.

A rectangular, metal trough 70 is secured to the top surface of the metal plate 58. Trough 70 is of a height equal to the height of the bottom closure member 62. The trough 70 is provided with an enlarged lip 72 around the top edge of the side walls thereof. The uppermost surface of the lip 72 is provided with a gasket receiving notch 74 which extends around the entire surface of the lip 72. A continuous gasket 76, such as an O-ring, is within the notch 74. The lip 72 has a hollow interior beneath the gasket receiving notch 74 which may be used as a water jacket, or jacket for other liquid or gas coolant. A duct 78 extends from the wall of the trough 70 through the adjacent wall of the bottom closure member 62, and to the door or faceplate 55. The duct 78 is securely fastened to both oven bottom 30 and door or faceplate 55 and is in communication with pipe 162 and valve 164. A plurality of lugs 80 are secured at spaced intervals to the inner surface of the trough 70 adjacent to but spaced from the uppermost surface of the lip 72.

U-shaped brackets 82 are secured to the bottom surface of the plate 58 along the sides of the plate 58. The arms of the brackets 82 extend outwardly from the plate 58, and a separate wheel 84 is rotatably supported between the arms of each of the brackets 82. Each of the wheels 84 has a V-shaped groove in its outer periphery, and the wheels 84 ride on V-shaped tracks 88. The tracks 88 extend along the floor 90 of the housing 14 to the open end of the housing 14. Thus, the assembly of the oven bottom 30, the plate 58, and the bottom closure member 62 is supported on the tracks 88 so that the assembly can be exposed by rolling the housing 14 away from faceplate 55.

A top envelope or closure sheet 92 formed of metal having a high melting point is proivded beneath oven top 28. Top envelope sheet 92 projects beyond the oven top 28 and extends beneath the top closure member 42. The top envelope sheet 92 may comprise a flat member, but preferably includes accommodation corrugation 94 for compensating for a thermal expansion and reduction. Such accommodation corrugation 94 is positioned on the envelope sheet 92 within the walls of the oven top 28.

A bottom envelope sheet 96 is provided above oven bottom 30. Bottom envelope sheet 96 projects beyond the oven bottom 30, and across the bottom closure member 62. Bottom envelope sheet 96 has a rectangular opening 98 therethrough, which is in alignment with the open top end of the trough 70. A rectangular clamping ring 100 is seated on the top surface of the bottom envelope sheet 96 around the edge of the opening 98. Clamping ring 100 has an internal flange 102 which extends downwardly into the trough 70. A plurality of cylindrical lugs 104 are secured to the inner surface of the flange 102, with each lug 104 being in alignment with a lug 80 of the trough 70. Bolts 106 extend through the cylindrical lugs 104, and are threaded into the lugs 80 to pull the clamping ring 100 downwardly against the bottom envelope sheet 96, and clamp the bottom envelope sheet 96 tightly against the uppermost surface of the lip 72 of the trough 70. The O-ring 76 in the uppermost surface of the lip 72 engages the bottom surface of the bottom envelope sheet 96, and provides a gas-tight seal between the bottom envelope sheet 96 and the lip 72 of the trough 70. The bottom envelope sheet 96 also includes an accommodation corrugation 108.

A middle closure member 110 is disposed intermediate the top envelope sheet 92 and the bottom envelope sheet 96. Middle closure member 110 is positioned directly between the top closure member 42 and the bottom closure member 62. The middle closure member 110 is provided with a hollow interior through which water or other liquid or gas coolant may be passed. The uppermost and bottommost faces of the middle closure member 110 is a rigid metal tube which spaces the flat envelope sheet 92 and 96 from each other. The middle closure 110 has a height equal to the distance between the flat envelope sheets 92 and 96 so that for honeycomb of varying heights, the same envelope sheets can be utilized and only the middle closure member need be changed. The middle closure member would merely be substituted for with a middle closure member having a greater or lesser height in accordance with the change in height of the honeycomb 12. The middle closure member 110 are each provided with a gasket receiving notch 112 which extends about the entire face of the middle enclosure member 110. A separate closed, continuous gasket 114, such as an O-ring, is within each of the notches 112. The O-rings 114 engage the top envelope sheet 92 and the bottom envelope sheet 96 to provide a gas-tight seal for the portion of the furnace 10 between the top envelope sheet 92 and the bottom envelope sheet 96.

A reference base or slab 116 of graphite, ceramic, or other suitable material for uniformly dissipating the heat from electric heating elements 36 is provided on the bottom envelope sheet 96. Reference base 116 supports the sandwich structure 12, and at the brazing temperature the sandwich structure 12 will assume the shape of the reference base 116. To support the weight of the reference base or slab 116, a plurality of ceramic rails 118 extend beneath the bottom envelope sheet 96. The rails 118 are mounted on upright supports 120 which are secured to the bottom plate 58 of the oven bottom 30.

A slab 122 of graphite, ceramic, or other suitable material for uniformly dissipating the heat from the electric heating elements 36 is provided on top of the top envelope sheet 92. A pair of headed guide rods 124 extend upwardly through the slab 122 with the heads of the guide rods 124 being recessed in the bottom surface of the slab 122. A separate nut 126 is threaded on each of the guide rods 124 and is seated on the top surface of the slab 122 to secure the guide rods 124 to the slab 122. The guide rods 124 extend upwardly through aligned holes 128 in the top wall 40 of the oven top 28 and the plate 38. A separate nut 130 is threaded on the top end of each of the guide rods 124 to limit the downward movement of the slab 122 with respect to the oven top 28.

To cool the furnace 10, a pair of containers 132 and 134 containing a coolant material are connected through valves 136 and 138 respectively to a pipe 140. Pipe 140 is connected to the interior of the housing 14 through a valve 142 and a pipe 144. Pipe 140 is connected to the interior of the oven top 28 through a valve 146, and pipes 148, 150, and 152. A quick disconnect 149 is provided in pipe 148. Pipe 140 is also connected to the interior of the oven bottom 30 through a valve 154, and pipes 156, 158, and 160. Each of the pipes 150, 152, 158, and 160 is provided with a spray nozzle on its end within the oven top 28 or oven bottom 30. The container 132 may contain carbon dioxide in liquid form, and the container 134 may contain carbon dioxide in gaseous form.

The operation of the furnace 10 of the present invention is as follows:

In order to insert the components forming the sandwich structure 12 and the leaves of braze metal, the oven top 28 is lifted from the top envelope sheet 92 by means of the hydraulic cylinders 50. This also raises the graphite slab 122 from the top envelope sheet 92. The quick disconnect 149 is opened.

Housing 14 is wheeled away from the door or faceplate 55 on the tracks 51. When the oven bottom 30 is in its exposed disposition, the top envelope sheet 92 is lifted from the middle closure member 110. The components of the sandwich structure 12 may then be operatively inserted in position on the reference slab 116. The top envelope sheet 92 may then be repositioned on the middle closure member 110, then housing 14 is moved forward to effect a gas-tight seal between O-ring 53 and door or faceplate 55.

When housing 14 is sealed against faceplate 55 then oven top 28 is directly above oven bottom 30 and oven top 28 can then be lowered until the top closure member 42 and the graphite slab 122 are seated on the top envelope sheet 92. Additional pressure from hydraulic cylinders 50 may be transmitted through top closure member 42 to effect a gas-tight seal between top envelope sheet 92, O-ring 114 and intermediate closure member 110. The quick disconnect 149 is then reconnected.

The housing 14, the oven top 28, and the oven bottom 30 can then be exhausted. The exhaustion of the housing 14 is effected through the port 18 by opening the valve 20 so that the interior of the housing is in communication with the exhaust means through the pipe 22. Exhaustion of the oven top 28 is effected through the holes 44, and exhaustion of the oven bottom 30 is effected through the holes 64. Thus, the exhaustion of the interior of the housing 14 also exhausts the interior of the oven top 28 and the oven bottom 30 to the same pressure.

The space between the top envelope sheet 92 and the bottom envelope sheet 96 is exhausted through the trough 70, duct 78, and pipe 162. The pipe 162 is connected to means for creating a vacuum, such as a vacuum pump, not shown, to effect evacuation. The space between the top envelope sheet 92 and the bottom envelope sheet 96 is exhausted to a lower pressure than the pressure within the oven top 28 and the oven bottom 30. The higher pressure above the top envelope sheet 92 and below the bottom envelope sheet 96 presses the sandwich construction 12 firmly against the graphite slab 116. By having the pressure within the oven top 28 and the oven bottom 30 below atmospheric pressure, the pressure differential across the envelope sheets 92 and 96 can be easily controlled to maintain intimate contact between the sandwich structure 12 and the graphite slab 116, but not sufficiently great to crush the sandwich construction 12.

With the pressures within the furnace 10 being maintained to provide intimate contact between the sandwich construction 12 and the graphite slab 116, the heaters 36 are turned on to heat the retort portion 16, and thereby braze together the components forming the sandwich structure 12. It is to be noted that the heating elements 36 may be provided with individual switches to permit but a small number of heating elements 36 to be used in the case of very narrow sandwich structures, thereby effecting material savings and expenditures for electrical power.

The flow of liquid or gas coolant through the top closure member 42, bottom closure member 62, middle closure member 110, and the lip 72 of the trough 70 may be used to cool the peripheral portions of the envelope sheets 92 and 96 and prevent heat damage to the O-rings 76 and 114. However, the O-rings 76 and 114 are preferably formed of material which is not adversely effected by the temperatures encountered in the peripheral portions of the envelope sheets 92 and 96.

The accommodation corrugations 94 and 108 take up the thermal expansion encountered during the brazing operation, and take up the contraction encountered after the high temperature phase of the brazing operation has been completed.

After the sandwich construction 12 has been brazed, it is desirable to subject the sandwich construction 12 to a heat-treat procedure to develop maximum strength in the sandwich construction 12. The heat-treat process requires rapid cooling of the sandwich construction 12, and also subsequent sub-zero cooling of the sandwich construction 12. To rapidly cool the sandwich construction 12, the coolant gas from the container 134 is admitted into the housing 14 by opening the valves 138, 146, and 154. Simultaneously an inert gas may be introduced into the space between envelope sheets 92 and 96 so that the differential pressure existing during the brazing operation may be maintained during the cooling cycle thus preventing crushing of the honeycomb panel. After the sandwich construction 12 is cooled by the coolant gas from the container 134, the liquid coolant from the container 132 is admitted into the oven top 28 and oven bottom 30 through pipes 150, 152, 158, and 160. As the liquid coolant passes through the nozzles in the ends of the pipes 150, 152, 158, and 160, the coolant liquid expands and effects rapid cooling of the sandwich construction 12 to sub-zero temperatures.

After the sandwich construction 12 has been properly cooled, the sandwich construction 12 can be reheated by means of the heaters 36 to continue the heat-treat process. Thus, the sandwich construction 12 may be cooled and reheated as many times as necessary to provide the desired heat-treat without removing the sandwich construction 12 from the furnace 10.

The furnace construction 10 of the present invention permits brazing to be done under closely controlled conditions without the necessity of resorting to sealed envelopes. Thus, the furnace of the present invention enables panels comprising sandwich structures to be brazed far more rapidly and cheaply than was possible by use of means heretofore used for that purpose. In addition, the furnace 10 of the present invention can be easily and quickly converted to braze sandwich constructions of various thicknesses. To convert the furnace 10 of the present invention to braze sandwich structures of various thicknesses, it is only necessary to replace the middle closure member 110 with a middle closure member of a height corresponding to the thickness of the sandwich structure to be brazed. This is accomplished when the housing 14 is rolled away from faceplate 55 to permit insertion of the components of the sandwich structure 12. Since the exhaust trough 70 and its associated exhaust duct 78 extend through the oven bottom 30 and the bottom envelope sheet 96, the middle closure member 110 can be easily replaced without the need for disconnecting or connecting any piping.

Referring to FIGURE 3, a modification of the furnace of the present invention is generally designated as 10'. The furnace 10' comprises a housing 14', and a retort portion, generally designated as 16', mounted within the housing 14'. The housing 14' is identical to the housing 14 of the furnace 10 of FIGURE 1.

The retort portion 16' of furnace 10' includes an oven top 28' and an oven bottom 30'. Oven top 28' is identical to the oven top 28 of the furnace 10 shown in FIGURE 1. Oven bottom 30' is identical to the oven bottom 30 of the furnace 10 of FIGURE 1, and includes an exhaust trough 70' and the related exhaust duct 78'. The oven top 28' is supported on the ends of piston rods 52' which extend downwardly from hydraulic cylinders 50' mounted on the top wall 48' of the housing 14'. Thus, the oven top 28' can be lifted away and lowered toward the oven bottom 30'. The oven bottom 30' is provided with wheels 84' which are mounted on tracks 88' on the floor 90' of the housing 14'.

A top envelope or closure sheet 92', which is identical to the top envelope sheet 92 of the furnace 10 of FIGURE 1, extends beneath the oven top 28' and the top closure member 42'. A bottom envelope sheet 96', which is identical to the bottom envelope sheet 96 of the furnace 10 of FIGURE 1, extends above oven bottom 30', and across the bottom closure member 62'. The bottom envelope sheet 96' has a square opening therethrough in alignment with the open top end of the exhaust trough 70', and the edge of the bottom envelope sheet 96' around the rectangular opening is seated on the uppermost surface of the lip 72' of the exhaust trough 70'.

An intermediate closure member 166 is seated on the top surface of the bottom envelope sheet 96' directly above the bottom closure member 62'. The intermediate closure member 166, like the bottom closure member 62', extends completely around the oven bottom 30'. The intermediate closure member 166 is provided with a hollow interior through which water or other coolant may be passed. A pipe 168 extends through the intermediate closure member 166 from the inner surface of the intermediate closure member 166. The pipe 168 is connected through a sealed connection 170 to an exhaust pipe 172. The exhaust pipe 172 extends through the wall of the housing 43' to an exhaust means, such as a vacuum pump. The exhaust pipe 172 includes a valve 174 to control the flow of air through the pipe 172.

The uppermost face and the bottommost face of the intermediate closure member 166 are each provided with a gasket receiving notch 176 which extends around the entire face of the intermediate closure member 166. A separate closed, continuous gasket 178, such as an O-ring, is within each of the notches 176. The O-ring 178 in the bottommost face of the intermediate closure member 166 engages the top surface of the bottom envelope sheet 96', and provides a gas-tight seal between the bottom envelope sheet 96' and the intermediate closure member 166.

An inner intermediate closure member 180 is seated on the top surface of the bottom envelope sheet 96' directly above the lip 72' of the exhaust trough 70'. The inner intermediate closure member 180 extends completely around the edge of the opening through the bottom envelope sheet 96'. The inner intermediate closure member 180 is provided with a hollow interior through which water or other coolant may be passed. The uppermost and bottommost faces of the inter intermediate closure member 180 are each provided with a closed, continuous gasket 182, such as an O-ring, within a gasket receiving notch. The O-ring 182 in the bottommost face of the inner intermediate closure member 180 engages the top surface of the bottom envelope sheet 96', and provides a gas-tight seal between the inner intermediate closure member 180 and the bottom envelope sheet 96'. The inner intermediate closure member 180 is provided with a plurality of spaced lugs 184 projecting from its inner surface, and positioned above the lugs 80' of the exhaust trough 70'. Bolts 186 extend through the lugs 184, and are threaded into the lugs 80' of the exhaust trough 70' to clamp the bottom envelope sheet 96' tightly between the inner intermediate closure member 180 and the lip 72' of the exhaust trough 70'.

An intermediate envelope sheet 188 extends across the oven bottom 30' between the top envelope sheet 92' and the bottom envelope sheet 96'. Intermediate envelope sheet 188 extends across and is seated on the uppermost surface of the intermediate closure member 166. Intermediate envelope sheet 188 is of a similar construction to that of the bottom envelope sheet 96', and includes a rectangular opening which is in alignment with the inner intermediate closure member 180. The intermediate envelope sheet 188 also includes an accommodation corrugation 190.

A rectangular clamping plate 192 extends over the portion of the intermediate envelope sheet 188 around the edge of the opening through the intermediate envelope sheet 188. Bolts 194 extend through the clamping plate 192, and are threaded into lugs 196 extending from the inner surface of the inner intermediate closure member 180. The bolts 194 clamp the clamping plate 192 against the intermediate envelope sheet 188 to provide a gas-tight seal between the intermediate envelope sheet 188 and the uppermost surface of the inner intermediate closure member 180.

A middle closure member 110', similar to the middle closure member 110 of the furnace 10 of FIGURE 1, is disposed intermediate the top envelope sheet 92' and the intermediate envelope sheet 188. Middle closure member 110' is positioned directly between the top closure member 42' and the intermediate closure member 166. A gas-tight seal is provided between the middle closure member 110' and each of the top envelope sheet 92' and the intermediate envelope sheet 188 by O-rings 114' in the uppermost and bottommost surfaces of the middle closure member 110'.

The reference base or slab 116', similar to the reference slab 116 of the furnace 10 of FIGURE 1, is provided between the bottom envelope sheet 96' and the intermediate envelope sheet 188. Reference base 116' supports the sandwich structure 12.

The operation of the furnace 10' is substantially the same as the operation of the furnace 10 of FIGURE 1, as previously described.

With the oven top 28' lifted away from the top envelope sheet 92' and the oven bottom 30' exposed by rolling housing 14' away from faceplate 55' the top envelope sheet 92' is removed and the components of the sandwich structure and the braze metal leaves are inserted in position on the intermediate envelope sheet 188. The top envelope sheet 92' is then repositioned on the middle closure member 110', and the housing 14' is wheeled against faceplate 55' to position oven top 28' above oven bottom 30'. The oven top 28' is then lowered until the top closure member 42' and the graphite slab 122' are seated on the top envelope sheet 92'.

The housing 14' is then exhausted. Since the interior of the oven top 28' and the oven bottom 30' are in communication with the interior of the housing 14', the interiors of the oven top 28' and the oven bottom 30' will be exhausted to the same pressure as the pressure within the housing 14'.

The space within the middle closure member 110' and between the top envelope sheet 92' and the intermediate envelope sheet 188 is exhausted through the exhaust trough 70' and its exhaust duct 78'. The space within the intermediate closure member 166 and between the intermediate envelope sheet 188 and the bottom envelope sheet 96' is exhausted through the exhaust pipe 168. The spaces within the middle closure member 110' and the intermediate closure member 166 are exhausted to lower pressure then the pressure within the oven top 28' and the oven bottom 30'. Thus, the higher pressure above the top envelope sheet 92' and below the bottom envelope sheet 96' presses the sandwich construction 12 firmly against the graphite slab 116'. By having the graphite slab 116' in a space separate from the space containing the sandwich structure 12, any outgasing or contaminates in the graphite slab 116' will not adversely effect the proper brazing of the sandwich structure 12. However, by having the graphite slab 116' in a space having a pressure below the pressure within the interior of the oven top 28' and the oven bottom 30', the pressures can be easily controlled to maintain intimate contact between the sandwich construction 12 and the graphite slab 116', but not sufficiently great to crush the sandwich construction 12.

With the pressures within the furnace 10' being maintained to provide intimate contact between the sandwich construction 12 and the graphite slab 116', the furnace 10' can be heated in the manner as previously described to braze together the components forming the sandwich structure 12. After the sandwich construction 12 has been brazed, it can be subjected to the heat-treat procedure previously described.

Although in the illustrated embodiments of the furnace of the present invention the exhaust trough is shown being in the oven bottom, the exhaust trough can be secured in the oven top. If the exhaust trough is secured in the oven top, the topmost envelope sheet is provided with the opening through which the exhaust trough is in communication with the space receiving the components of the sandwich structure. Also instead of a single elongated exhaust trough, a plurality of exhaust pipes may be provided which extend through separate openings in the envelope sheet and which are connected to one or more exhaust manifolds.

The present invention may be embodied in other specific forms without departing from the spirit or essential attributes thereof and, accordingly, reference should be made to the appended claims, rather than to the foregoing specification as indicating the scope of the invention.

I claim:

1. A furnace comprising separable top and bottom sections, means for heating the interior of said sections, a pair of planar envelope sheets intermediate said top and bottom sections, a closure member between said envelope sheets, the bottommost of said envelope sheets having an opening therethrough, means for maintaining the uppermost sheet in intimate contact with a sandwich construction position between such sheets, said means extending through said bottom section and in communication with the space between said envelope sheets through the opening in the bottommost sheet for evacuating the space between the envelope sheets, a reference slab seated on the bottommost envelope sheet, a slab seated on the topmost envelope sheet, an intermediate envelope sheet extending between the topmost and bottommost envelope sheets and over the reference base, said intermediate envelope sheet having an opening therethrough in alignment with the opening in the bottommost envelope sheet, the means extending through the bottom section being in communication with the space between the topmost envelope sheet and the intermediate envelope sheet through the openings in the bottommost envelope sheet and said intermediate envelope sheet, means sealing the space between the intermediate envelope sheet and the bottommost envelope sheet from the passage through the openings, and a pair of closure members between said envelope sheets, one of said closure members being between the topmost envelope sheet and the intermediate envelope sheet and the other closure member being between the bottommost envelope sheet and the intermediate envelope sheet.

2. A furnace in accordance with claim 1 including means for evacuating the space between the bottommost envelope sheet and the intermediate envelope sheet.

3. A furnace including separable top and bottom oven sections, means for heating the furnace interior, a separate closure member extending around and secured to each of said top and bottom oven sections, a pair of flat planar envelope sheets intermediate said top and bottom oven sections, said envelope sheets extending between said closure members, a rigid middle closure member between said envelope sheets, said rigid middle closure member having a height equal to the distance between said flat planar envelope sheets, a slab of heat dissipating material on the bottommost sheet and between said sheets, the bottommost envelope sheet having an opening therethrough adjacent said middle closure member, and means for maintaining the uppermost sheet in intimate contact with a sandwich construction positioned between said sheets, said means extending through said bottom oven section and in communication with the space between said envelope sheets through the opening in the bottommost envelope sheet for evacuating the space between the envelope sheets.

4. A furnace including separable top and bottom oven sections, means for heating the furnace interior, a separate closure member extending around and secured to said top and bottom oven sections, a pair of envelope sheets intermediate said top and bottom oven sections, said envelope sheets extending between said closure members, a middle closure member between said envelope sheets, a slab of heat dissipating material on the bottommost sheet and between said sheets, the bottommost envelope sheet having an opening therethrough adjacent said middle closure member, means extending through said bottom oven section and in communication with the space between said envelope sheets through the opening in the bottommost envelope sheet for evacuating the space between said envelope sheets, said means for evacuating the space between the envelope sheets comprising a trough seated in the bottom oven section, an exhaust duct extending from said trough through said bottom oven section, and means for sealing the portion of the bottommost envelope sheet around the opening therethrough to the uppermost open end of said trough.

5. A furnace including separable top and bottom oven sections, means for heating the furnace interior, a separate closure member extending around and secured to each of said top and bottom oven sections, three envelope sheets intermediate said top and bottom oven sections, said envelope sheets extending between said closure members, an intermediate closure member between the bottommost of the envelope sheets and the intermediate envelope sheet, a middle closure member between the topmost of said envelope sheets and said intermediate envelope sheet, sealing means between said intermediate and middle closure members and their adjacent envelope sheets, the bottommost envelope sheet and the intermediate envelope sheet having aligned openings therethrough, means extending through the bottom oven section and in communication with the space between the topmost envelope sheet and the intermediate sheet through the openings in said bottommost and intermediate envelope sheets for evacuating the space between the topmost and the intermediate envelope sheets, and means sealing the space between the bottommost and envelope sheets from the passage through the openings.

6. A furnace in accordance with claim 5 in which the means for evacuating the space between the topmost envelope sheet and the intermediate envelope sheet comprises a trough seated in the bottom oven section, an exhaust duct extending from said trough through said bottom oven section, and means for sealing the portion of the bottommost envelope sheet around the opening to the uppermost open end of said trough.

7. A furnace in accordance with claim 6 in which the means for sealing the space between the bottommost and the intermediate envelope sheets from the passage through the openings comprises an inner closure member between the portion of the bottommost and intermediate envelope sheets around the openings, and sealing means between said inner closure member and the adjacent envelope sheets.

8. A furnace in accordance with claim 7 including means for evacuating the space between the bottommost and intermediate envelope sheets.

9. A brazing furnace comprising a housing, separable top and bottom oven sections within and spaced from the walls of said housing, said oven sections defining an interior therebetween, means on a top wall of said housing supporting said top oven section in depending relation therefrom, means for heating the interior of said sections, a separate closure member extending around and secured to each of said top and bottom oven sections, a pair of spaced envelope sheets intermediate said top and bottom oven sections, said envelope sheets extending between said closure members, a middle closure member between said sheets, the bottommost envelope sheet having an opening therethrough, means for maintaining the uppermost sheet in intimate contact with a sandwich construction positionable between said sheets, said means extending through said bottom oven section and in communication with the space between said envelope sheets through the opening in the bottommost envelope sheet for evacuating the space between the envelope sheets, and means for selectively cooling the space between the uppermost sheet and the top oven section.

10. A brazing furnace in accordance with claim 9 including wheel means on said bottom oven section, said wheel means riding on the bottom wall of said housing, and means providing for selective removal of an end wall of said housing.

References Cited in the file of this patent

UNITED STATES PATENTS

| | | |
|---|---|---|
| 1,380,713 | Hazeltine | June 7, 1921 |
| 1,463,438 | Olsen | July 31, 1923 |
| 1,892,112 | Moore et al. | Dec. 27, 1932 |
| 2,477,796 | Germany | Aug. 2, 1949 |
| 2,556,962 | Field | June 12, 1951 |
| 2,671,658 | Moore | Mar. 9, 1954 |
| 2,727,937 | Boyer | Dec. 20, 1955 |
| 2,787,457 | Bogdan | Apr. 2, 1957 |
| 2,814,561 | Erasmus | Nov. 26, 1957 |
| 2,856,172 | Kautz | Oct. 14, 1958 |
| 2,984,732 | Herbert | May 16, 1961 |